United States Patent [19]
van Suylekom et al.

[11] Patent Number: 5,238,516
[45] Date of Patent: Aug. 24, 1993

[54] METHOD FOR EMBOSSING HOLOGRAMS

[75] Inventors: Gijsbertus van Suylekom, Bilthoven; Edward J. van der Laan, Almere, both of Netherlands

[73] Assignee: Koninklijke Emballage Industrie van Leer B.V., Amstelveen, Netherlands

[21] Appl. No.: 691,033

[22] PCT Filed: Nov. 29, 1990

[86] PCT No.: PCT/NL90/00179
§ 371 Date: Jun. 24, 1991
§ 102(e) Date: Jun. 24, 1991

[87] PCT Pub. No.: WO91/08524
PCT Pub. Date: Jun. 13, 1991

[30] Foreign Application Priority Data

Nov. 29, 1989 [NL] Netherlands ............... 8902949

[51] Int. Cl.$^5$ .................. B29C 59/00; G03H 1/02
[52] U.S. Cl. .......................... 156/230; 156/233; 156/235
[58] Field of Search ............. 156/230, 233, 235

[56] References Cited

U.S. PATENT DOCUMENTS

| | | |
|---|---|---|
| 3,882,207 | 5/1975 | Hannan et al. . |
| 3,922,416 | 11/1975 | Ryan . |
| 4,629,647 | 12/1986 | Sander ............... 156/235 |
| 4,631,222 | 12/1986 | Sander ............... 156/235 |
| 4,631,223 | 12/1986 | Sander ............... 156/235 |
| 4,758,296 | 7/1988 | McGrew . |
| 5,104,471 | 4/1992 | Antes et al. ........ 156/233 |

FOREIGN PATENT DOCUMENTS

| | | |
|---|---|---|
| 0034392 | 8/1981 | European Pat. Off. . |
| 0201323 | 11/1986 | European Pat. Off. . |
| 1221342 | 2/1971 | United Kingdom . |
| 2129739 | 5/1984 | United Kingdom . |

*Primary Examiner*—Jill L. Heitbrink
*Attorney, Agent, or Firm*—Young & Thompson

[57] ABSTRACT

Method for producing a material embodying an interference pattern, in which there is solvent-coated a transparent, thermoformable lacquer on one side of a base film, which lacquer is capable of forming a releasable direct bond with the base film. The lacquer is dried so as to form a solid lacquer layer. An interference pattern is formed by embossing the side of the solid lacquer layer which faces away from the base film with a printing device carrying the negative of the interference pattern. The embossed side of the lacquer layer is clad with a metal layer. A substrate is glued onto the metal layer, and the base film is released from the lacquer layer. A second base film is provided with a second transparent lacquer layer, and an interference pattern is introduced in this second lacquer layer. Then the second lacquer layer is applied by means of a transparent glue onto the first lacquer layer, and the second base film is removed.

4 Claims, 2 Drawing Sheets

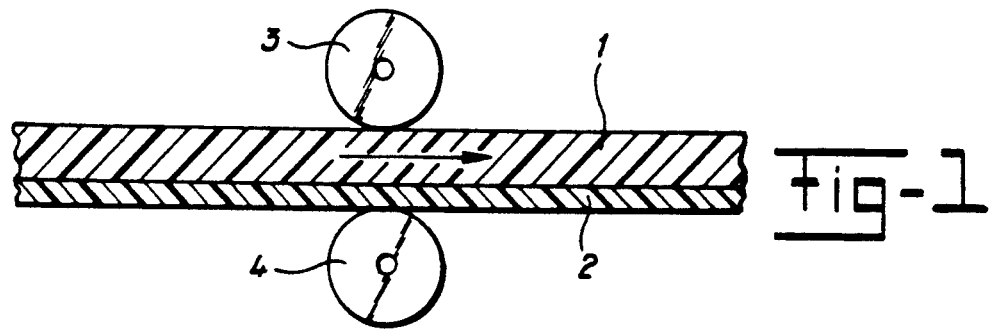
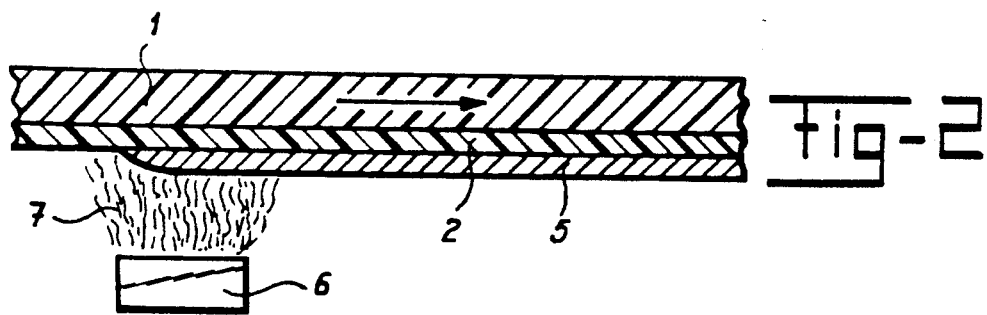
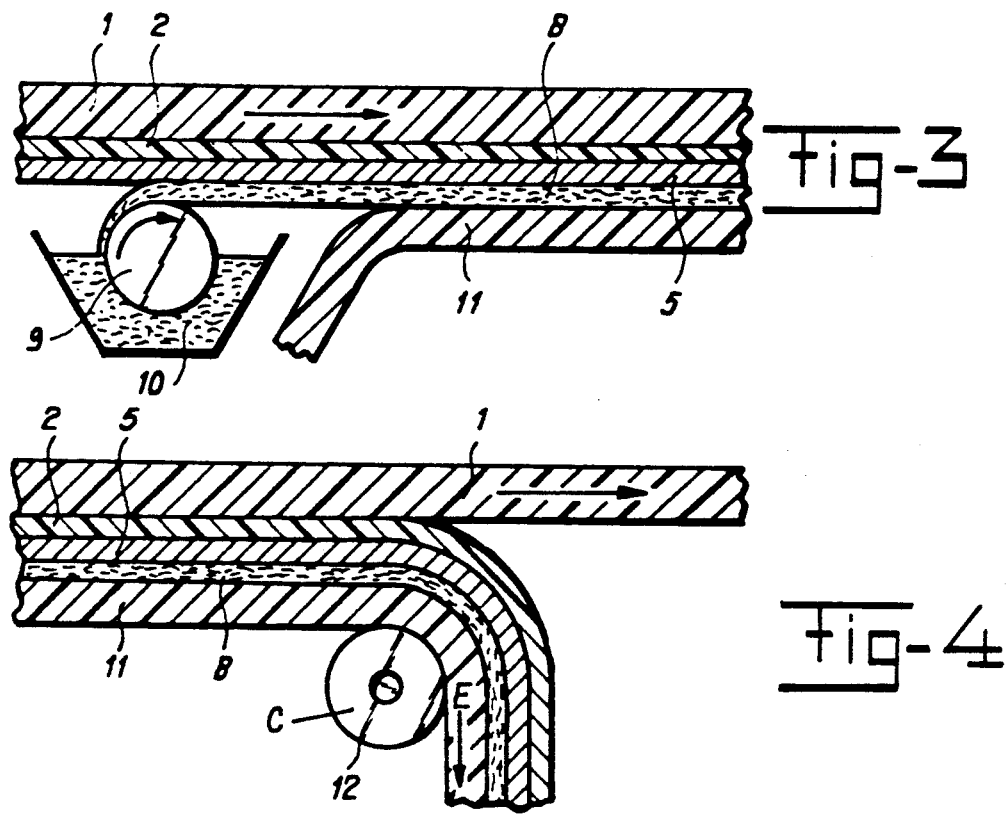

METHOD FOR EMBOSSING HOLOGRAMS

The invention relates to a method for producing a material embodying an interference pattern, for example a holographic image, in which the interference pattern is introduced into a transparent layer situated on a plastic base film, a substrate being applied onto the opposite side of the transparent layer and the plastic base film being removed. Such method is known from U.S. Pat. No. 4,758,296. According to said patent, a resin layer containing a diffractive pattern is covered with a polyester film. In order to make a transfer film (i.e., a hot-stamping foil) said polyester film is treated for moderate adhesion to the resin layer, so that the resin layer will remain attached until it is later adhered to another surface.

The moderate adhesion of the polyester film to the resin layer is obtained by applying a separate release layer on the plastic base film and subsequently applying the resin layer on the release layer.

This known method is beset by a number of disadvantages. As the first disadvantage, mention is made of the fairly high costs associated with this method. All these stem from the fairly large number of layers which have to be applied to one another. The finished product, for example a sheet printed with holographic images, is consequently expensive. This method is therefore less suitable for producing wide strips of sheet-type material such as, for example, luxury packaging paper.

The object of the invention is to provide a method which is less expensive. This is achieved by applying a liquid lacquer containing a plasticizer and having a contact angle of zero degrees with respect to the plastic base film, said lacquer being capable of forming a releasable bond with the surface of the plastic base film, to a smooth major surface of said plastic base film, forming the interference pattern in the finished lacquer layer, and stripping off the plastic base film from the lacquer layer with the substrate. A saving is now achieved by omitting the step of applying a separate release layer. Surprisingly, the lacquer layer appears to form an excellent medium for introducing a holographic image into it.

The step of applying a liquid lacquer layer having a contact angle of zero degrees with respect to the base film, which lacquer layer is capable of forming a releasable bond with the surface of the plastic base film, to a smooth major surface of said plastic base film, is in itself known form EP-B-34392. However, in said patent it is not recognized that said lacquer layer is surprisingly well fit for forming a holographic image into it.

According to a first variant of the embodiment of the method according to the invention, the plastic base film is holographically printed with the aid of a printing device, such as an impression cylinder, embodying the negative of the interference pattern and the transparent release layer is then applied to the printed side of the plastic base film in a manner such that the interference pattern is imaged in the transparent release layer. When the transparent release layer is applied to the printed side of the plastic base film, the release layer is also shaped in accordance with the holographic image.

In this variant of the embodiment, it is particularly attractive to use a plastic base film which can be used a number of times in the production process such as is described in said European Patent No. 34,392. In that case, the plastic base film has only to be printed once with a hologram, while a large number of products having a holographic image can nevertheless be obtained by transferring the holographic image on the plastic base film in all cases directly to the transparent release layer. The expensive printing device, for example an impression cylinder, is therefore saved and it is only necessary to provide it once for a good impression in the plastic base film in order to obtain a large number of holographic imprints with a correspondingly high quality.

As the second variant of the embodiment, it is also possible that the transparent release layer is applied to the plastic base film and the transparent release layer is then printed with the aid of a printing device, such as an impression cylinder, embodying the negative of the interference pattern. In this case, the release layer has then to be printed separately in each case with the impression cylinder which embodies the negative of the holographic image.

Furthermore, it is possible, according to the invention, that after the plastic base film on the release layer has been removed, a second transparent release layer provided with an interference pattern, for example a holographic image, and situated on a second plastic base film is applied by means of a transparent glue, after which the second plastic base film is removed. In this way two holographic images can be applied above each other. However, the lowermost holographic image in the direction of observation will be partly covered by the uppermost one. In general, it will not, however, be a problem if the foreground provided by the uppermost holographic image is somewhat more blurred than the rearmost one.

The temperature and pressure during the printing of the holograms can be significantly reduced if the release layers are plasticized. This also affects the service life of the plastic base film advantageously. As examples of plasticizers for plasticizing the release layer, mention is made of phthalates, citrates, phosphates, adipates, azelates, sebacates, ditridecyl phthalates and polymeric plasticizers of polyethers and polyurethanes.

The method according to the invention is suitable for producing objects such as credit-cards etc. The holographic pattern or other interference pattern produced affords a high degree of safety against falsifications. Moreover, two or more such patterns may be applied one on top of the other, making the appearance of a cord even more difficult to falsify.

According to an alternative embodiment, the transparent layer is also clad with a reflecting layer such as a metal layer, after which the substrate is glued onto the reflecting layer. This embodiment is highly suitable for producing the luxury packaging paper indicated above.

The invention will now be explained further with reference to two exemplary embodiments.

FIG. 1 shows the first step of the method according to the invention, in which a holographic image is introduced into a release layer.

FIG. 2 shows the second step of the invention, in which the release layer is metallized.

FIG. 3 shows the third step of the method according to the invention, in which a substrate is glued to the metal layer.

FIG. 4 shows the fourth step of the invention, in which the plastic base film is removed.

Figure 5:
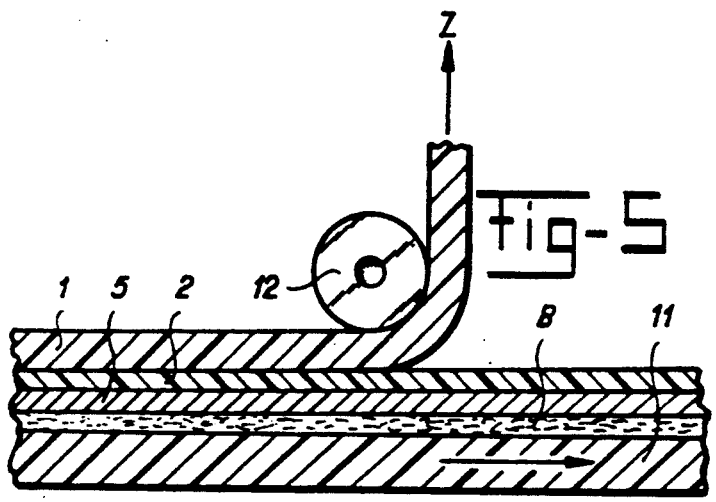
FIG. 5 shows an alternative for the method step according to FIG. 4.

In the method step shown in FIG. 1, an assembly comprising a plastic base film 1 and a release layer 2 is passed through the nip of two pressure rollers 3, 4 situated opposite each other. The pressure roller 4 is provided with a holographic image which is introduced into the release layer 2. Said release layer 2 may, for example, be plasticized with W2 (DSM) or Priplast (Unichema). As shown in FIG. 2, the printed release layer is then provided in vacuo with a metal layer 5 in a known manner, a metal vapour being deposited on the release layer 2 from a crucible 6.

Then a glue layer 8 is applied to the metal layer by means of a roller 9 which is partly immersed in the glue stock 10. The sheet-type substrate 11 is applied to the glue layer and finally, as shown in FIG. 4, the assembly comprising release layer 2, metal layer 5, glue layer 8 and substrate 11 is passed over the roller 12. In this process, the plastic base film 1 is stripped off the transparent release layer 2, exposing the holographic image. As shown in the variant of FIG. 5, the plastic base film 1 may, however, instead be passed over the roller 12 and consequently be stripped off the said assembly.

Figure 6:
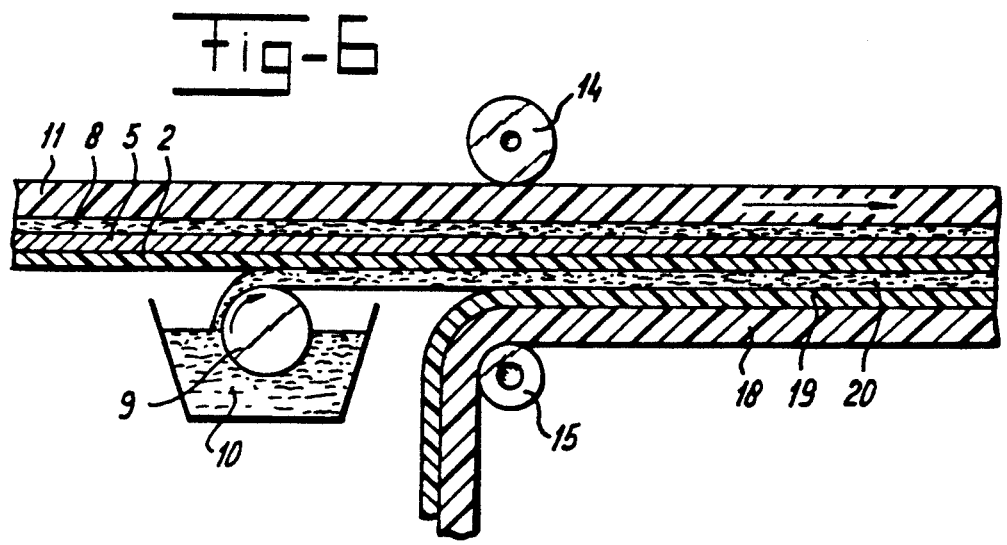
FIG. 6 shows an additional step for applying a second release layer embodying a holographic image.

FIG. 6 shows that a second holographic image can be laminated onto the finished substrate embodying a holographic image. In this process, an assembly comprising a second plastic base film 18 and a second release layer provided with a holographic image is applied with the rollers 14, 15 to the first release layer 2 by means of a transparent glue layer 20. Then the second plastic base film 18 is also removed. The second release layer 19 is not itself metallized. In this way, two superposed holographic images become visible, the metal layer 5 reflecting the light incident through the two release layers 2, 19. It is conceivable to apply still more release layers to one another. However, in that case the light yield decreases ever further so that the number of release layers with transparent glue layers between them must not become too large.

Figure 7:
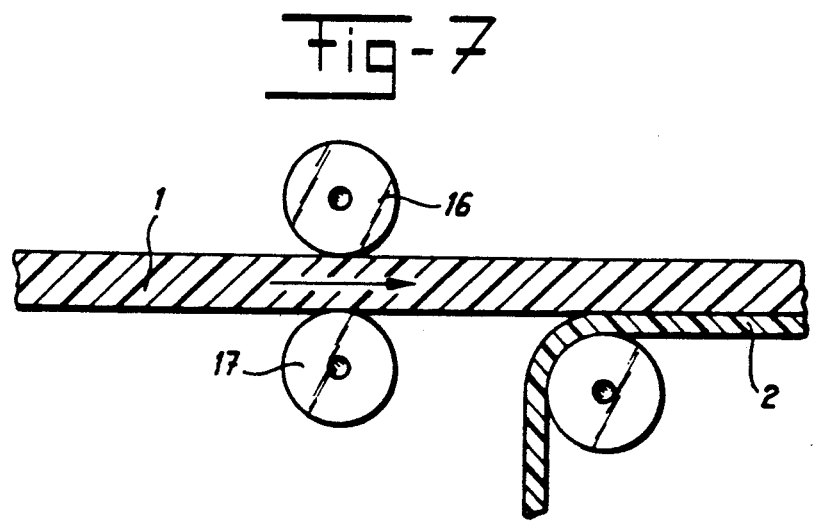
FIG. 7 shows another variant

FIG. 7 shows still another variant of the method. In this case, only the plastic base film is passed between a pressure roller pair 16, 17. A holographic image is applied during this process to the plastic base film by means of the pressure roller 17, after which the release layer 2 comes to rest on the holographic image formed in this way. In this process, the release layer takes on the form of the holographic image in the plastic base film 1. If the plastic base film is of a quality such that it can be used several times, said plastic base film 1 of course only needs to be passed once between the roller pair 16, 17. As soon as the holographic image has been introduced into the plastic base film, it then no longer needs to be passed through between the nip of the rollers 16 and 17 during further use and the release layer 2 can be applied directly to it in all cases. The release layer 2 may be applied while it is still fluid. After solidification by evaporation of the solvent, the substrate may be applied onto the finished release layer.

The method according to the invention offers great advantages in producing sheet-type material such as luxury packaging paper. It is, however, also conceivable to print cheap CDs by this method. It is also possible to bring about other optical effects such as diffraction patterns and Fresnel lenses. Finally, it is also possible to colour the release layer in order to obtain special effects.

We claim:

1. Method for producing a material embodying an interference pattern, comprising the steps of
   forming an interference pattern in a first transparent layer,
   cladding said first transparent layer with a metal layer,
   forming an interference pattern in a second transparent layer, and
   securing said second layer to said first layer in superposed relationship on the side of said first layer opposite said metal layer.

2. Method for producing a material embodying an interference pattern, comprising the steps of:
   providing a base film,
   solvent coating a transparent, thermoformable lacquer on one side of the base film which lacquer is capable of forming a releasable direct bond with the base film,
   drying the lacquer so as to form a solid lacquer layer,
   introducing an interference pattern by embossing the side of the solid lacquer layer which faces away from the base film with a printing device carrying the negative of said interference pattern,
   cladding the embossed side of the lacquer layer with a metal layer,
   gluing a substrate onto the metal layer,
   releasing the base film from the lacquer layer,
   providing a second base film with a second transparent lacquer layer,
   introducing an interference pattern in said second lacquer layer,
   applying said second lacquer layer by means of a transparent glue onto the first lacquer layer, and
   removing the second base film.

3. Method according to claim 2, wherein the transparent layers are plasticized with a plasticizer.

4. Method according to claim 2, wherein said interference pattern is a holographic image.

* * * * *